United States Patent [19]

Lung-Sheng

[11] Patent Number: 5,377,712
[45] Date of Patent: Jan. 3, 1995

[54] REVOLVING AND SLIDING CANOPY

[76] Inventor: Chen Lung-Sheng, No. 222, Sec. 1, Po-An Street, Su-Lin Tsen, Taipei Hsien, Taiwan, Prov. of China

[21] Appl. No.: 111,340

[22] Filed: Aug. 24, 1993

[51] Int. Cl.[6] .............................................. E04H 15/06
[52] U.S. Cl. .................................. 135/88.13; 296/105; 135/129; 135/141
[58] Field of Search ................. 135/88, 103, 109, 106, 135/89, 96, 101, 102, 112; 296/100, 105, 104

[56] References Cited

U.S. PATENT DOCUMENTS

| | | | |
|---|---|---|---|
| 3,064,667 | 11/1962 | Marino | 296/105 X |
| 3,201,171 | 8/1965 | Wickard | 296/105 X |
| 3,433,470 | 3/1969 | Erke | 296/100 X |
| 4,289,346 | 9/1981 | Bourgeois | 296/105 |
| 4,883,305 | 11/1989 | Horton | 296/105 |
| 5,005,896 | 4/1991 | Li | 296/100 |

FOREIGN PATENT DOCUMENTS

| | | | |
|---|---|---|---|
| 128918 | 6/1932 | Austria | 296/105 |
| 1469581 | 1/1967 | France | 296/105 |
| 2157246 | 10/1985 | United Kingdom | 296/100 |

Primary Examiner—Lanna Mai
Attorney, Agent, or Firm—Larson and Taylor

[57] ABSTRACT

The present invention relates to a revolving & horizontally sliding truck canopy and more particularly relate to a revolving platform which locates in a longitude chute-gap and can be controlled by an one-way controller with connecting to chute-gap. Once controlled by one-way controller, it can be revolved upward and slide horizontally to the top of the hood of a truck.

1 Claim, 6 Drawing Sheets

REVOLVING AND SLIDING CANOPY

FIELD OF THE INVENTION

The present invention is in the field of a revolving & horizontally sliding canopy, which is particularly suitable to truck owners who need to use a telescopic canopy. Its features include a revolving platform which is connected to the first canopy of canopy in two sides of the truck body fixer and locates in the rectangular chute-gap. With connection to one-way controller and situated on the horizonal beam of the truck body fixer by rectangular chute-gap, canopy of present invention can be revolved upward and slide horizontally to the top of the hood of the truck when it is closed. It also features in allowing the side panels of the truck body which released down due to slide buttress situated between main slide track and vice slide track.

BRIEF DESCRIPTION OF THE PRIOR ART

It is known that conventional canopy, as the device of Taiwanese patent No. 7323567, is composed of several groups telescopic rails which slide between slide tracks located on both sides of the truck funnel. The canopy is stored right rear of the hood when it is not in use. Such a method of storing is not allowed the side panels of the truck funnel to be released down, thereby it occupies much space when the canopy is not in use. While desire to load or unload cargoes, it would be very inconvenient and takes a lot of time and work because it is only done from right rear the truck.

SUMMARY OF THE INVENTION

It is thus an object of the present invention to overcome the problems mentioned above. In the embodiment of this invention, a revolving & horizontally sliding canopy which can be revolved upward and slide horizontally, forward to the top of the truck hood by cooperation between the revolving platform and one-way controller when it is not in use. Such method serves the purpose of saving a lot of spaces for the truck funnel and making loading and unloading more conveniently.

One fundamental object of the invention, is to provide a slide buttress supporting main and vice slide track which the canopy slides. The functions of supporting buttress showed supporting and guiding chute-gap for main and vice slide tract to match well. If slide-gasket for activating slide buttress comes off, two side panels of truck funnel are able released. Through the canopy of the invention is not revolved upwards, either making unloading or loading is convenient.

In practicing the present invention, the following technique may be employed:

DETAILED DESCRIPTION OF THE PREFERRED EMBODIMENTS

Figure 1:
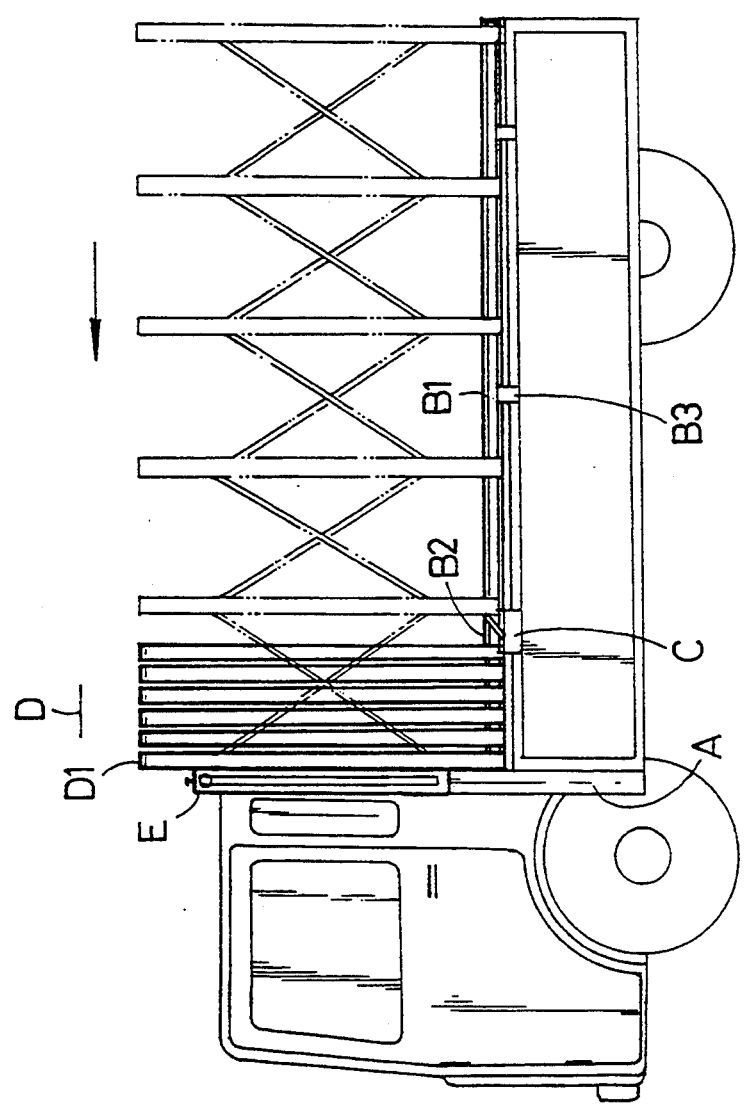
FIG. 1 is a side view of the canopy in use.

Referring to FIG. 1 of the invention, shows a main slide track (B1) and a vice slide track (B2) locate on a specific position above the two side panels of the truck funnel, which are intended to allow the canopy (D) slide telescopically. The main slide track (B1) is positioned by a supporting buttress (B3) and a vice slide track (B2) is positioned and supported on the first canopy (D1) of the canopy (D). Another slide supporting buttress (C) is located underneath the intersection of main slide track (B1) and vice slide track (B2). Those serves to allow above-mentioned canopy (D) to slide telescopically and smoothly, between main slide track (B1) and vice track (B2), to make it fixing in the field of vice track when it is closed.

Figure 2:
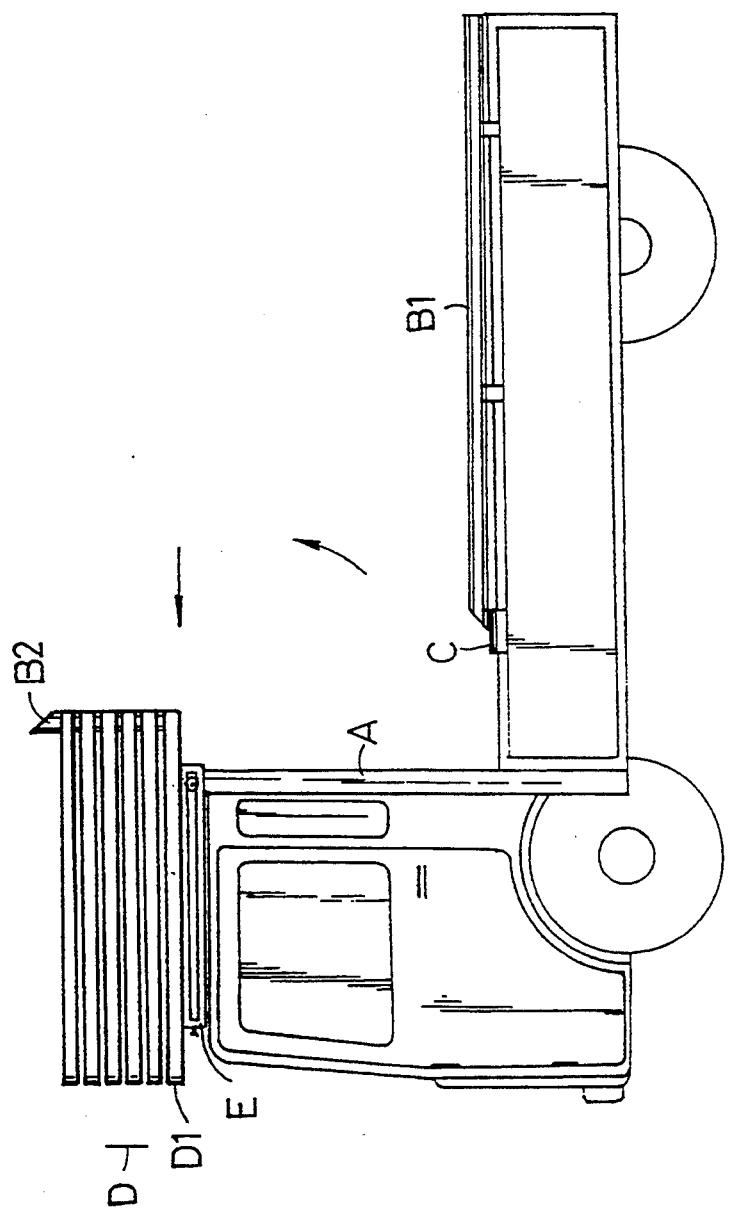
FIG. 2 is a side view of canopy stored on top of the truck hood.

A revolving platform (E) is located between two sides of truck body fixer (A), right behind the hood is connected to the first canopy (D1) of the canopy (D). In order to make canopy revolving upwards, sliding horizontally and forwarding to the top of truck hood when canopy (D) is closed. Thus, FIG. 2 shows such a way to save a lot of space for the truck funnel.

Figure 3:
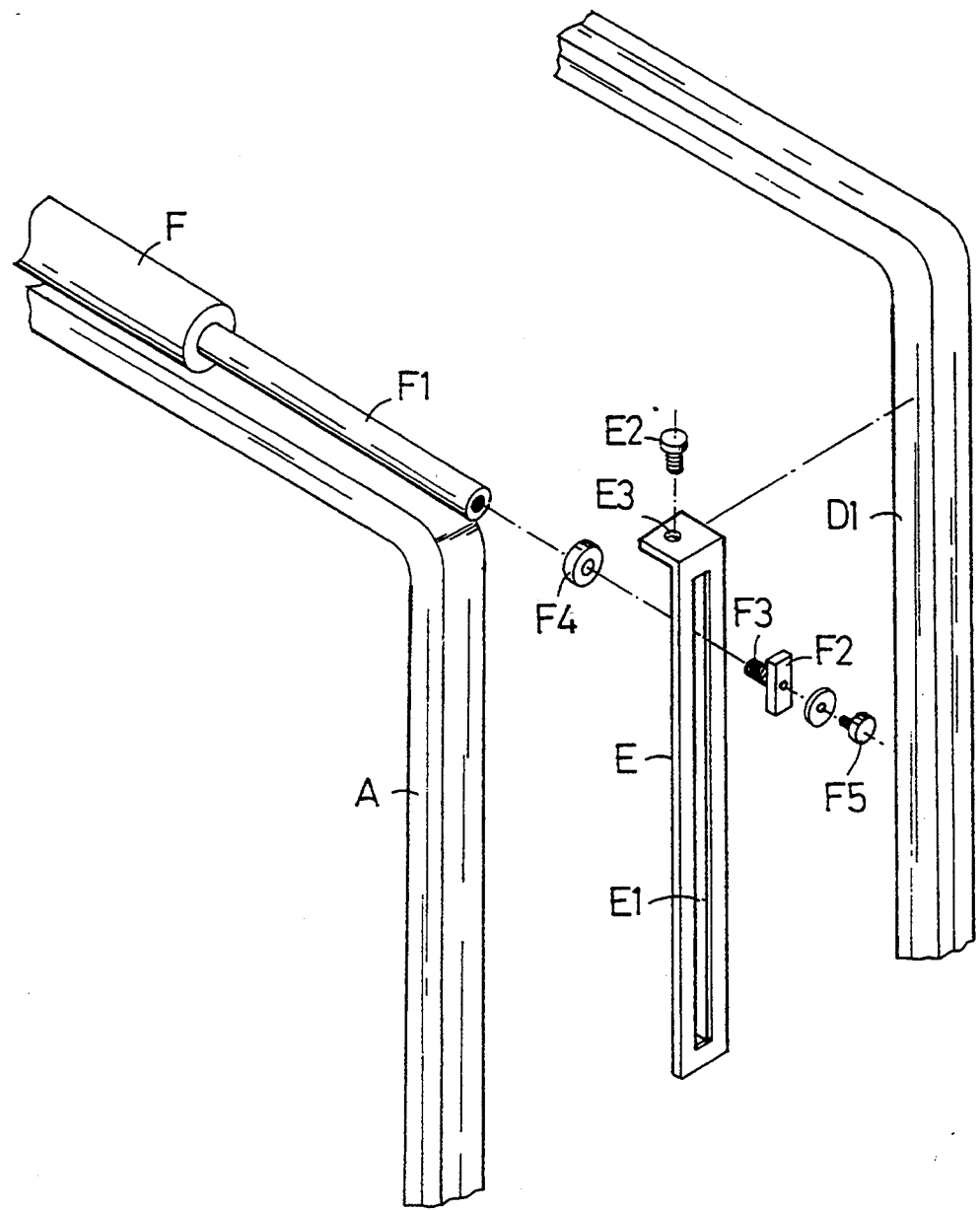
FIG. 3 is an exploded perspective diagrammatic view of a device of revolving platform.

Referring now also to FIG. 3 shows the exploded diagram of the revolving platform (E), in a great detail and a L-shape. The detail structure of the platform (E) is activated to make sure the canopy (D) revolve upward and slide forward, horizontally; within the body of the platform is cut into a rectangular gap (E1). The revolving platform (E) is connected to the first canopy (D1) of the canopy (D) at a specific position on the other side.

An one-way controller (F) is located on horizontal beam, which is fixed onto the truck body fixer (A), said controller (F) can be extended to two ends. Besides, an one way rotating shaft (F1) can be found in each ends of one-way controller (F), which can be rotated straightly or reversely. The above-mentioned one-way controller (F) is one kind of conventional one-way rotating control unit, which will not be described here.

As prescribed one-way controller (F), a bolt (F3) is established on the side of the rectangular ingot (F2), facing to rotating shaft (F1). The width of rectangular ingot (F2) is about same as width of the chute-gap (E1), which belongs to revolving platform (E). And bolt (F3) is mounted to a running wheel (F4), which touches the vertical side of the revolving platform (E); wherein, the chute-gap (E1) of the revolving platform (E) can be mounted on rectangular ingot (F2), but revolving platform (E) won't come out from rectangular ingot (F2), which a positioning screw (F5) is attached, if the rectangular ingot (F2) is welded or touched the end of rotating shaft (F1) by the bolt (F3).

Figure 5:
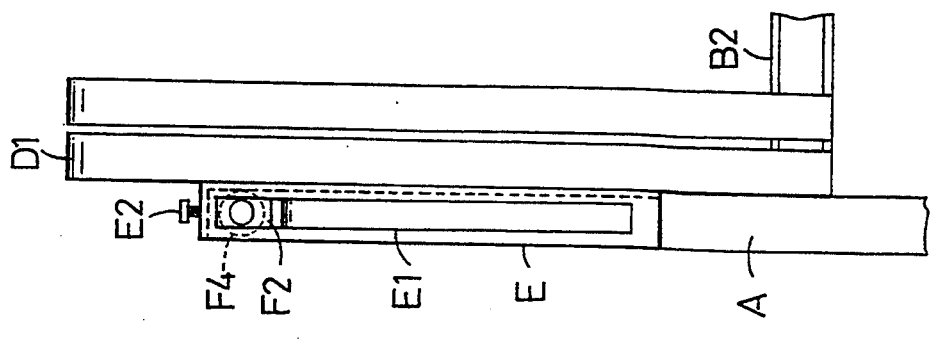
FIG. 5 is a front view of FIG. 3.
Figure 4:
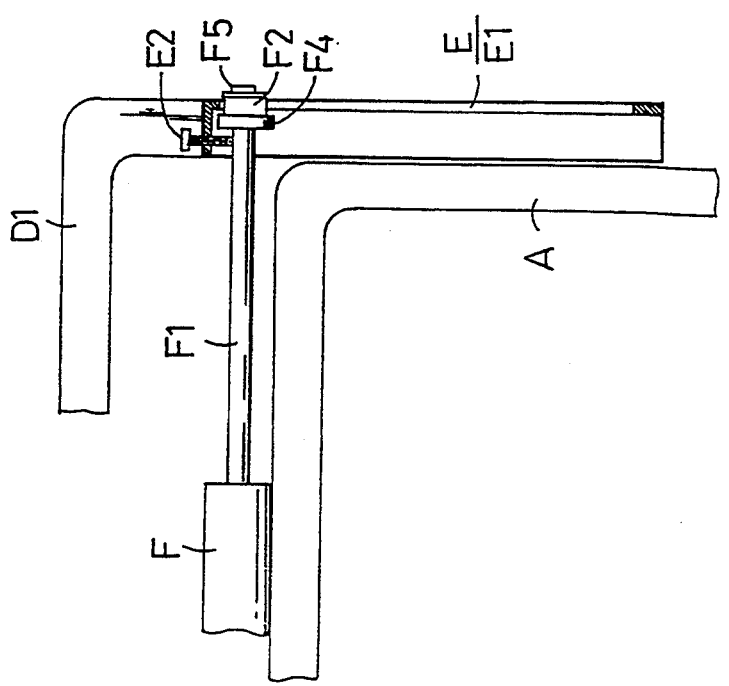
FIG. 4 is a side view of FIG. 3.

Refer to FIGS. 4 and 5, illustrates a means how revolving platform (E), which is connected to rotating shaft (F1). When the canopy (D) is revolved upward by any person through rotating shaft (F1) which works as an axis of rotation, the chute-gap (E1) of the revolving platform (E) will be drive and around the rotating shaft (F1) to revolve by rectangular ingot (F2) at a corresponding angle, such as how it works at a horizonal angle respect to FIG. 6. Depending this step, the canopy (D) is staying at a horizonal level unless it is imposed by a revolving force, the rotating shaft (F1) can be rotated in one-direction under direction limitations of the one-way controller (F) and the weight of the canopy together with its revolving torque, is offset totally by both of rectangular ingot (F2) and the running wheel (F4).

Figure 7:
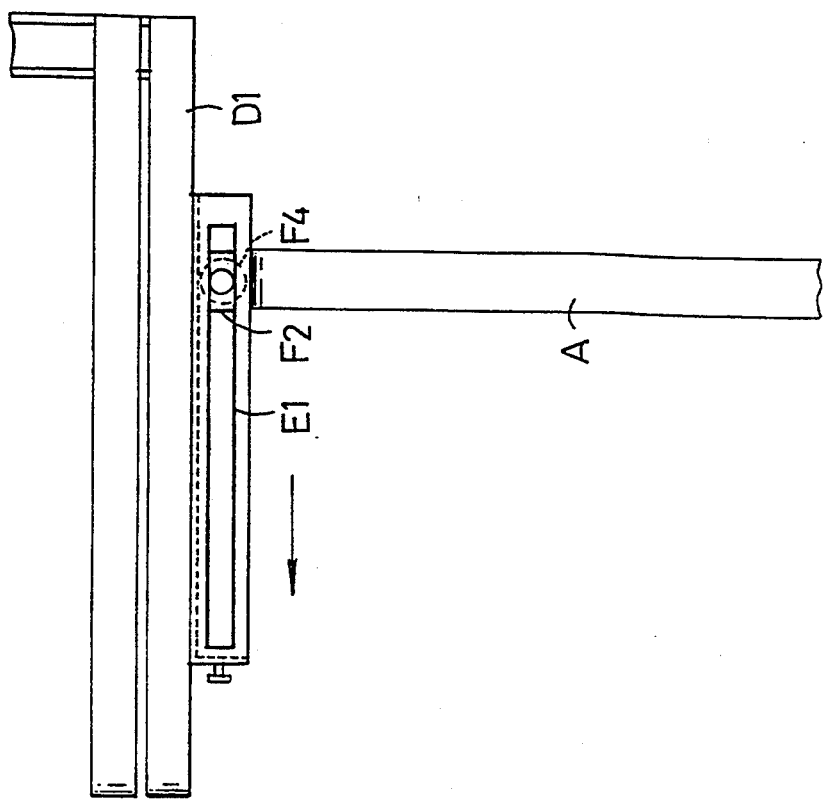
FIG. 7 is a side view of the canopy moved horizontally.

The function of revolving platform (E) is revolved upward to a horizonal level and pushed forward; pushed horizontally by a force, the revolving platform (E) will slide forward via both of rectangular ingot (F2) and running wheel (F4), such a achievement is respect to FIG. 7. Thus, the canopy (D) is put on the top of the truck hood as showed in FIG. 2. Once, someone intend to back the canopy (D) to its original position, set the revolving platform (E) slide horizontally first, then make one-way controller (F) rotating to different direction, the canopy (D) will be revolved and back to its original position by a series of contrary procedures.

Figure 6:
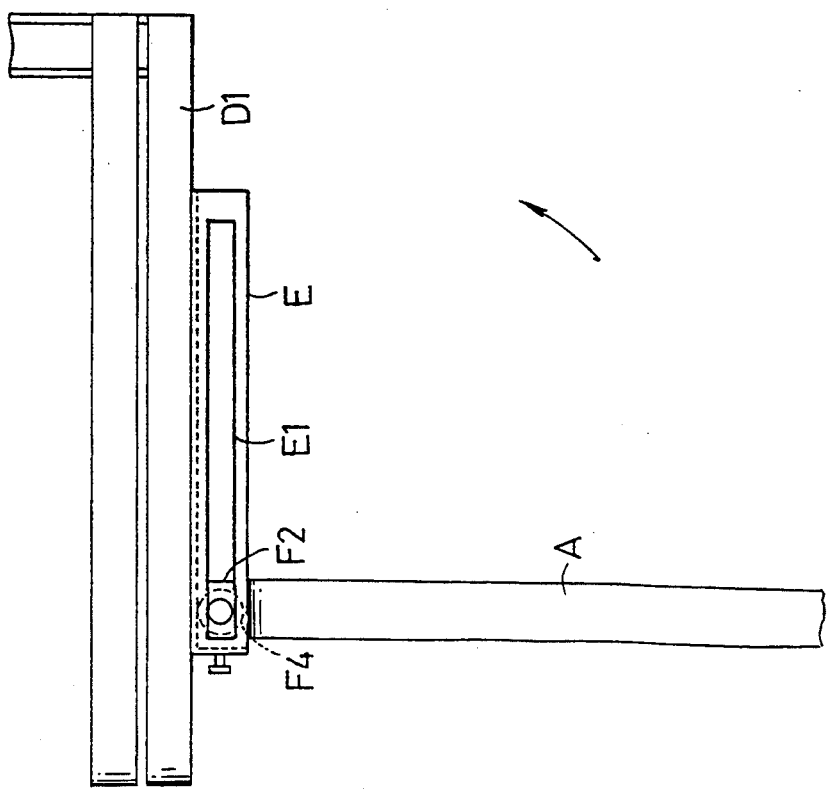
FIG. 6 is a side view of the canopy revolved to a horizontal level.

When the position of the canopy (D) is changed from the position showed in FIG. 6 to position showed in FIG. 7, either the center of gravity in the compound set of the canopy (D) or the rotating shaft (F1) is changed to top of the truck hood. By this way, head of the canopy (D) will be downward in accord to rotating direction of rotating shaft (F1); thereby, the canopy (D) will slide horizontally and smoothly, wherein one supporting chute-track (not showed here) is built on the top of the truck hood, which facing to the revolving platform (E). In addition, to set canopy (D) stable on the top of the truck hood, a positioning buckle in any form (not showed here) can be locked the canopy (D) on top of the truck hood.

Figure 8:
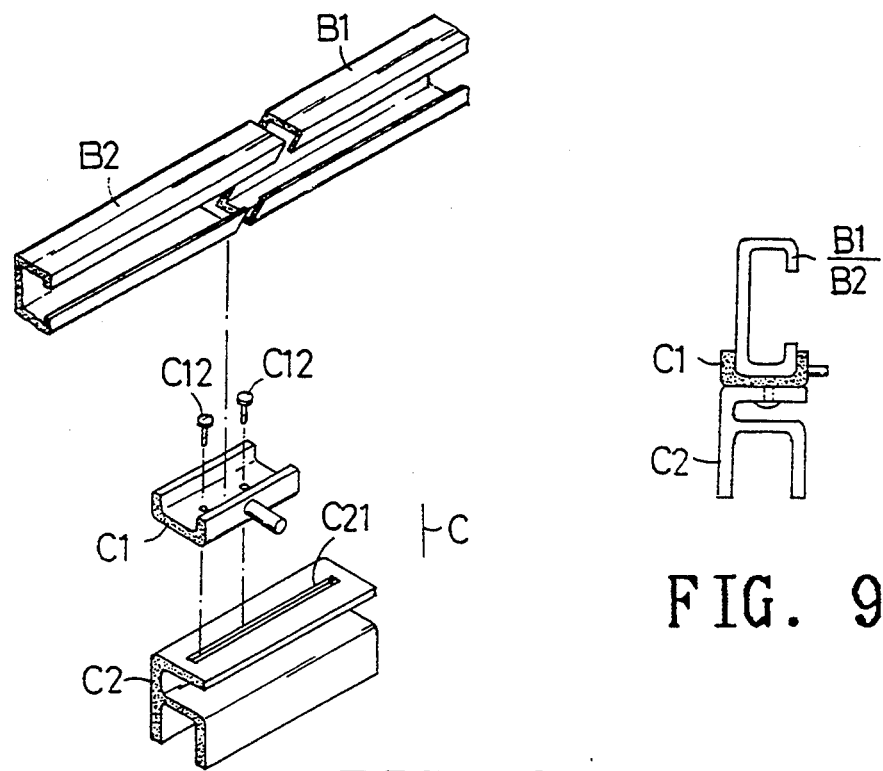
FIG. 8 is an exploded perspective diagrammatic view of the slide buttress connected to the main and vice slide track.
Figure 9:
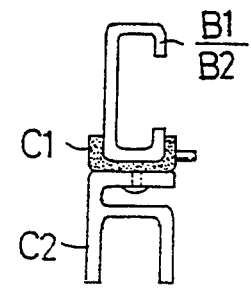
FIG. 9 is a side view of slide supporting buttress.
Figure 10:
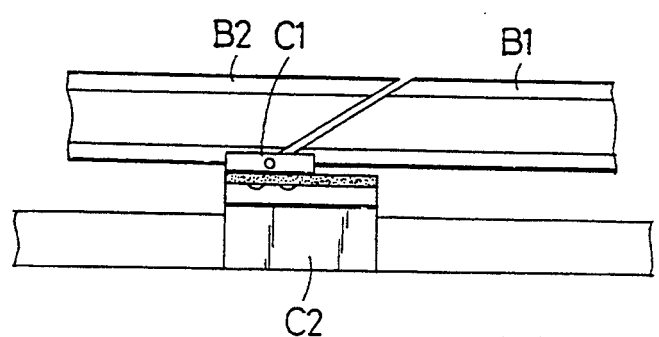
FIG. 10 is a front view of FIG. 9.

A slide buttress (C) is placed underneath tilt intersection of main slide track (B1)and the vice slide track (B2), slide piece (C1) can be mounted to the lower end of main slide track (B1) or vice slide track (B2); inner dimension of said slide piece-(C1) is almost same as the outer dimension of main slide track (B1) or vice slide track (B2). wherein, two bolts (C12) are inserted into the rectangular chute-gap (C21) of the slide supporting buttress (C), keep the slide piece (C1) sliding on top of supporting buttress (C2) (refer to FIGS. 8 and 9). The main and the vice slide tracks (B1 and B2) will be guide to right position by slide piece (C1); keep the canopy (D) sliding smoothly while it slides on the intersection of main and vice slide tracks B1 and B2, refer to FIG. 10; the canopy (D) should not be effected even slide piece (C1) touch intersection of main and vice slide tracks B1 and B2.

Figure 11:
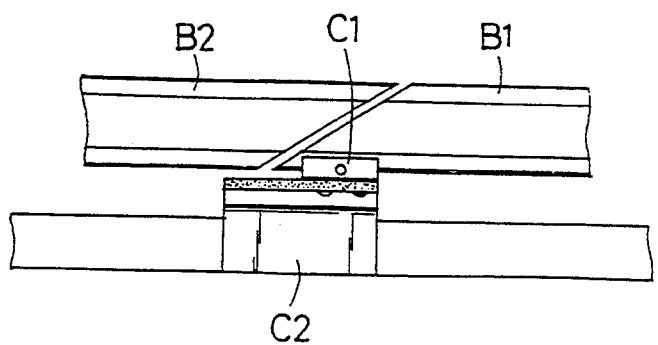
FIG. 11 is a front view of FIG. 9 in another position.

To put down the side panels attached to the truck funnel when canopy (D) is stored at the position showed in FIG. 1, move slide piece (Cl) toward main slide track (B1) to keep it from away vice track (B2), then side panel will be released and put down separately as showed in FIG. 11.

Though the intersection of main and vice slide track and B2 should be guided in right way by slide piece (C1), in order to prevent any possible happening that canopy (D) is not sliding smoothly because of the level height of main and vice slide track B1 and B2 is not the same due to the gravity of the canopy (D) or resistance made by descending vice slide track (B2) imposing on slide piece (C1) of slide buttress (C); wherein, vice slide track (B2) is just fixed on one side of the first suspending canopy. An adjusting screw (E2) is located on top of revolving platform (E) as showed in FIG. 3 and 4. The level height of the revolving platform (E) is adjusted by said adjusting screw (E2) when it is screwed inside hole (E3); wherein, end of adjust screw (E2) touches the rotating shaft (F1) of the one-way controller (F), in other words, vice slide track (B2) can be adjusted to same level height of the main slide track (B1) by the screw (E2) accordingly.

In a summary, the embodiment of this invention is to keep and stored canopy revolving upwards and sliding horizontally to the top of truck hood, to avoid the stored canopy occupying too much room of the truck funnel and keep loading or unloading conveniently. The foregoing invention has been described with respect to particularly preferred embodiments thereof. However, variations and modifications would be obvious to those skilled in the art.

What is claimed is:

1. A revolving and sliding canopy having a plurality of canopy portions, said canopy comprising
   a one-way controller having a rotating shaft with an end portion;
   a pivotable platform having a head portion, and a body portion said platform being connected to the first one of said canopy portions at one side of said first portion, and having a rectangular chute-gap within the body portion of said platform and an adjusting screw built on said head portion in order to contact with said rotating shaft:
   a rectangular ingot fixed to said end portion of said rotating shaft such that said shaft is rotated by said platform when said platform is moved;
   a slide piece;
   a wheel mounted between said slide piece and said end portion of said rotating shaft so as to engage one side of said platform;
   a main slide track and a vice slide track which have an intersection therebetween; and
   a slide supporting buttress located underneath said intersection of said main slide track and said vice slide track, said slide piece being guided to slide between said main slide track and said vice slide track.

* * * * *

UNITED STATES PATENT AND TRADEMARK OFFICE
CERTIFICATE OF CORRECTION

PATENT NO. : 5,377,712
DATED : Jan. 3, 1995
INVENTOR(S) : CHEN, Lung-Sheng

It is certified that error appears in the above-identified patent and that said Letters Patent is hereby corrected as shown below:

On title page, item [19] and [76] should read as follows:

Inventor: CHEN, Lung-Sheng, No. 222, Sec. 1,

Signed and Sealed this

Twenty-fifth Day of April, 1995

*Attest:*

BRUCE LEHMAN

*Attesting Officer*     *Commissioner of Patents and Trademarks*